(12) United States Patent
Pool (10) Patent No.: US 7,866,932 B1
(45) Date of Patent: Jan. 11, 2011

(54) CONTAINER LOADER WITH CONTAINER WALL PROTECTOR AND METHOD FOR LOADING A CONTAINER

(75) Inventor: Dennis C. Pool, Byron Center, MI (US)

(73) Assignee: SP Industries, Inc., Hopkins, MI (US)

( * ) Notice: Subject to any disclaimer, the term of this patent is extended or adjusted under 35 U.S.C. 154(b) by 373 days.

(21) Appl. No.: 12/038,144

(22) Filed: Feb. 27, 2008

Related U.S. Application Data (60) Provisional application No. 60/904,552, filed on Mar. 2, 2007.

(51) Int. Cl.
B65G 67/04 (2006.01)

(52) U.S. Cl. .................... 414/400; 100/188 R; 414/809

(58) Field of Classification Search ................ 414/400, 414/809; 100/188 R
See application file for complete search history.

(56) References Cited

U.S. PATENT DOCUMENTS

| | | | |
|---|---|---|---|
| 3,040,914 A * | 6/1962 | Johnson et al. ............. 414/395 |
| 3,088,499 A | 5/1963 | Rieger | |
| 3,186,568 A | 6/1965 | Spinanger et al. | |
| 3,507,409 A | 4/1970 | Gordon | |
| 3,621,775 A | 11/1971 | Dedio et al. | |
| 3,625,139 A | 12/1971 | Gollnick | |
| 3,722,561 A * | 3/1973 | O'Leary et al. ............. 141/316 |
| 3,734,005 A | 5/1973 | Vogel | |
| 3,750,813 A | 8/1973 | Fishburne | |
| 3,815,323 A | 6/1974 | Longo | |
| 3,893,385 A | 7/1975 | White | |
| 4,044,569 A | 8/1977 | Harza | |
| 4,181,460 A | 1/1980 | Lutz | |
| 4,522,556 A * | 6/1985 | Shapiro ...................... 414/809 |
| 4,537,554 A * | 8/1985 | Collins, Jr. .................. 414/328 |
| 4,677,909 A | 7/1987 | Beesley et al. | |
| 4,729,304 A | 3/1988 | Gardella et al. | |
| 5,044,870 A * | 9/1991 | Foster ........................ 414/809 |
| 5,148,739 A | 9/1992 | Fox | |
| 5,551,336 A | 9/1996 | Griffin et al. | |
| 6,168,371 B1 | 1/2001 | Lesmeister et al. | |
| 6,427,585 B1 | 8/2002 | Brown et al. | |
| 6,609,871 B2 | 8/2003 | Pfeiffer et al. | |
| 7,172,382 B2 | 2/2007 | Frankel | |
| 7,275,906 B1 | 10/2007 | Pool | |
| 2008/0219818 A1* | 9/2008 | Adams et al. ............... 414/404 |

* cited by examiner

*Primary Examiner*—James Keenan
(74) *Attorney, Agent, or Firm*—Van Dyke, Gardner, Linn & Burkhart, LLP (57) ABSTRACT

A container loader includes a loading ram and a side wall protector device for protecting side walls of a container, such as a trailer or a shipping container. The side wall protector device includes a pair of spaced-apart movable side plates with at least one actuator connected to the side plates. The side plates are selectively extendable into spaces adjacent the container side walls by the actuator and are retractable therefrom, such that the side wall protector device substantially contains a loading pressure within the container and substantially prevents the pressure from exerting force upon the container side walls.

20 Claims, 6 Drawing Sheets

CONTAINER LOADER WITH CONTAINER WALL PROTECTOR AND METHOD FOR LOADING A CONTAINER

CROSS REFERENCE TO RELATED APPLICATION

The present application claims the benefit of U.S. provisional application, Ser. No. 60/904,552, filed Mar. 2, 2007, which is hereby incorporated herein by reference in its entirety.

FIELD OF THE INVENTION

The present invention relates generally to bulk material loaders, and, more particularly, to container loaders adapted to push bulk materials into a trailer or a shipping container.

BACKGROUND OF THE INVENTION

Load-hauling trailers or shipping containers for transporting bulk materials are typically backed up to a loading dock and loaded with the aid of a ram device. Bulk materials are typically at least somewhat compressible, and may include, for example, paper or paper products, garbage, recyclables, or construction waste. For efficiency reasons, it is desirable to provide a loading machine that includes a ram device for pushing bulk materials toward the closed end of the trailer, compressing the bulk materials in the process. However, some of the pressure exerted on the bulk materials typically causes the bulk materials to exert outward pressure on any trailer surface with which the materials are in direct contact, such as the floor, side walls, closed trailer end, and ceiling. To resist this outward pressure and prevent bowing of the sidewalls, such trailers may typically be equipped with sidewalls that are structurally stronger, and thus typically heavier, than would otherwise be necessary for transporting the bulk materials. Alternatively, such as for trailers not equipped with strengthened sidewalls, the ram pressure may be reduced to prevent damage to the trailer sidewalls, resulting in less bulk material being loaded into the trailer than would otherwise be possible.

SUMMARY OF THE INVENTION

The present invention provides a container wall protector that is extendable and retractable along the inner walls of a container such as a shipping container or a load-hauling trailer, such as to allow for reduced structural strength of the container and/or to increase the amount of bulk material that may be added to the container without causing damage to the trailer.

According to an aspect of the present invention, a container wall protector suitable for use at or on or with a bulk materials loader for loading materials into a container, such as a shipping container or truck trailer or the like, is located at a loading dock or the like, and includes a pair of spaced-apart movable side plates and an actuator or actuatable force-applying device connected to the side plates. The actuator is operable to selectively extend and retract the side plates alongside the side walls of the container. The container wall protector substantially contains a loading pressure within the container and limits or substantially precludes the pressure from exerting force upon the container side walls.

The side plates may be extendable to an extended position where the distal ends of the side plates are adjacent a front wall of the container. Optionally, the actuator may be a hydraulic cylinder, a pneumatic cylinder, or an electric actuator or the like. Optionally, two actuators may be provided, with one actuator coupled to each side plate.

According to another aspect of the present invention, a method for protecting side walls of a container, such as a shipping container or truck trailer or the like, during loading of bulk materials, such as waste and/or recyclables, via a loader or the like, includes providing a material loader for loading bulk materials into the container, and providing spaced-apart movable side plates and an actuator connected to the side plates. The side plates are selectively extendable and retractable alongside the container side walls via the actuator. The movable side plates are generally aligned with the side walls of the container, and the actuator is actuated to extend the side plates into the spaces adjacent the side walls. The loader is actuated to load the bulk materials into the container, whereby the presence of the side plates provides structural rigidity along the side walls of the container to limit or substantially preclude bowing of the side walls of the container as the materials are loaded and/or compressed in the container. The actuator may be operable to retract the side plates from the spaces adjacent the side walls after the container is loaded.

Therefore, the present invention allows a user to load bulk material into a container without damaging the container walls, and/or facilitates the use of containers having less structural strength than would otherwise be necessary to avoid bowing and/or damage to the side walls of the container. The container wall protector extends a pair of side plates along the inside of the container's walls prior to loading the container (or at least prior to loading an amount of materials that would lead to contacting and bowing of the side walls of the container), whereby the side plates receive and withstand a substantial portion of the pressure transmitted from the bulk materials toward the container walls, thus substantially preventing the container walls from bowing, bending, or deforming during the loading process.

These and other objects, advantages, purposes, and features of the present invention will become apparent upon review of the following description in conjunction with the drawings.

DESCRIPTION OF THE PREFERRED EMBODIMENTS

Figure 1:
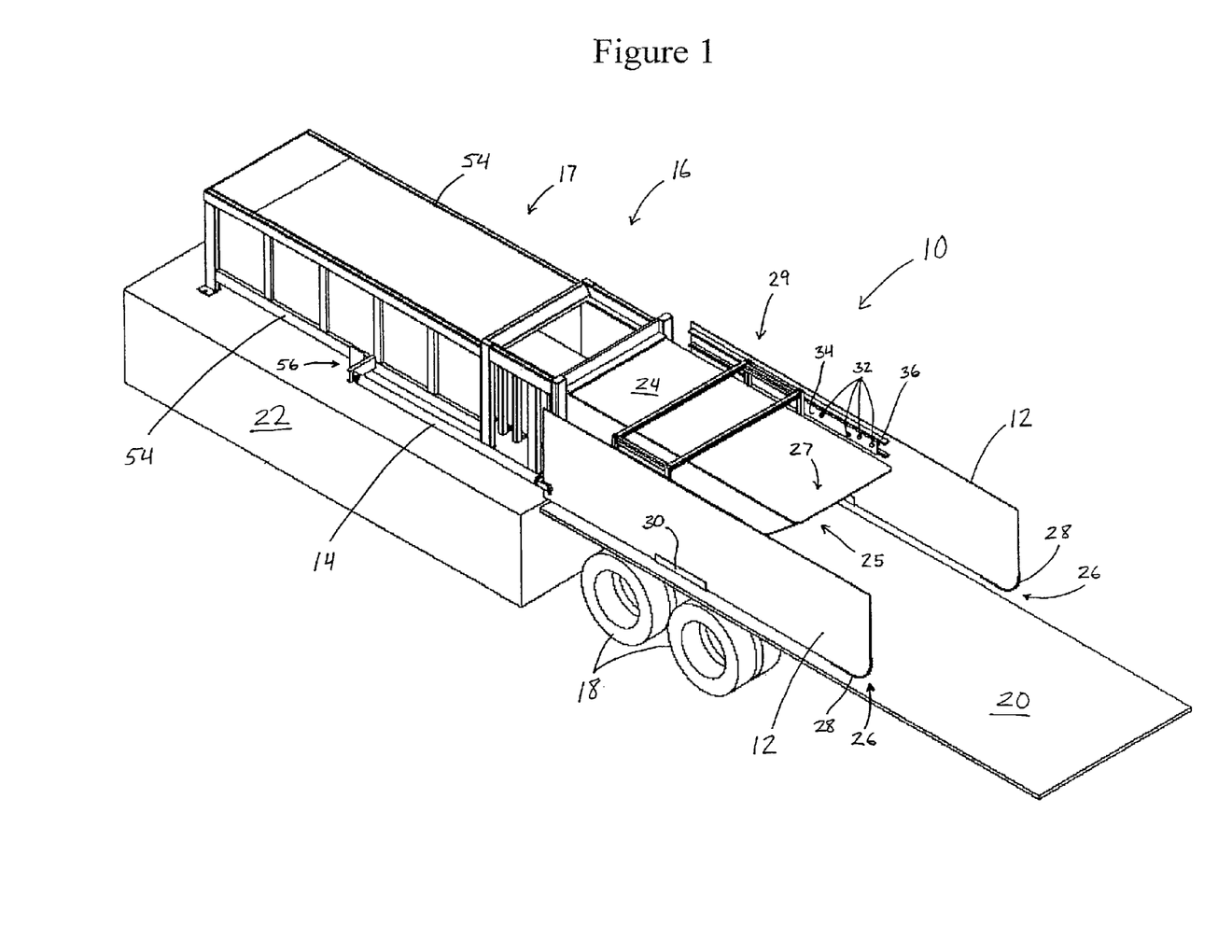
FIG. 1 is a perspective view of a bulk material loader with a container wall protector in accordance with the present invention.
Figure 4:
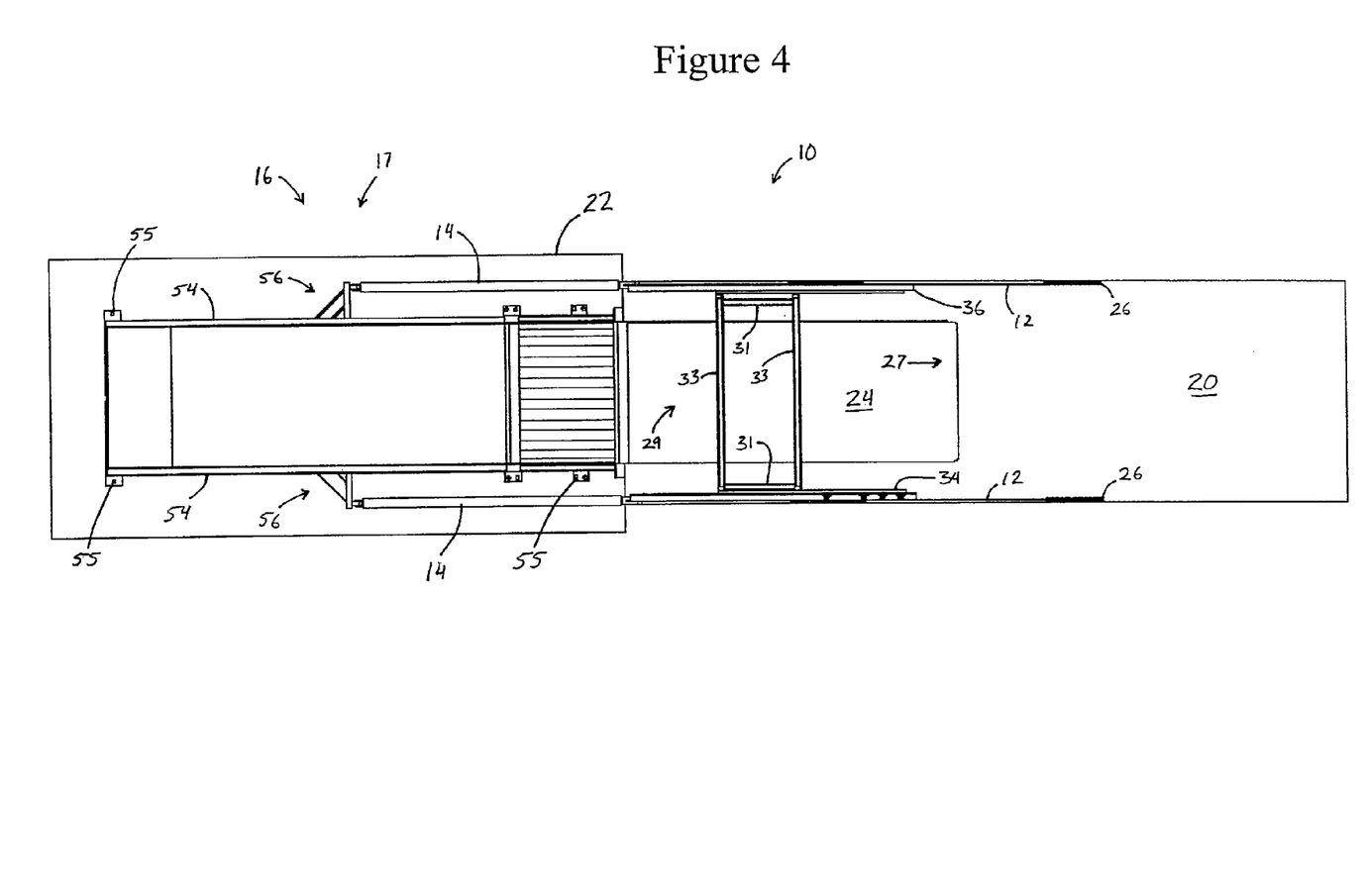
FIG. 4 is a top plan and partial sectional view of the loader and container wall protector.
Figure 5:
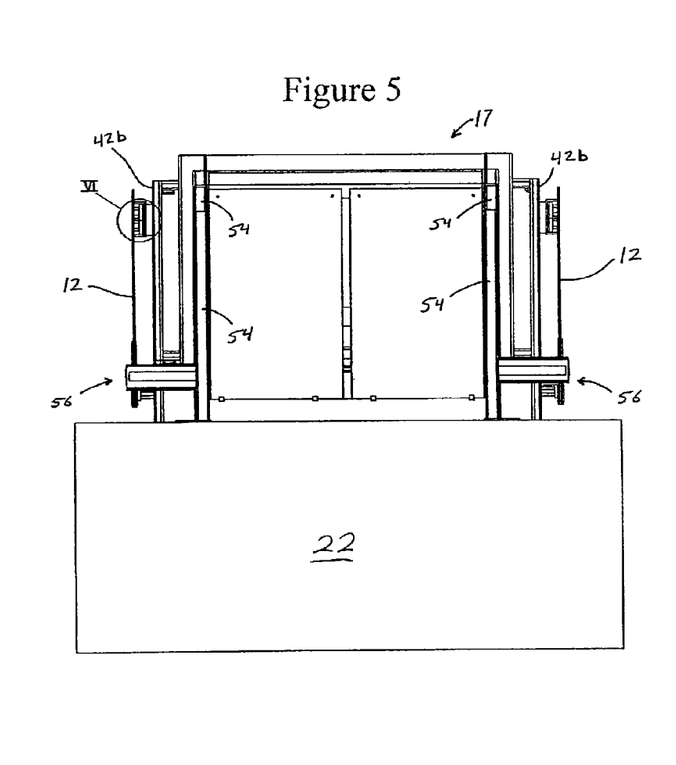
FIG. 5 is a rear end elevation of the loader and container wall protector of FIG. 1.

Referring now to the drawings, a bulk materials loader or loading device 16 for loading bulk materials, such as waste and/or recyclables or the like, into a container, such as a truck trailer or shipping container or the like, includes or is associated with a container wall protector device 10 that is operable to provide structural rigidity at the side walls of the container during the loading process. Container wall protector device 10 includes a pair of spaced-apart slide plates or extendable/retractable plates or side plates 12, each having a force-applying device or actuator 14, such as a hydraulic cylinder or linear actuator or the like, connected thereto. Loading device 16 includes a base portion 17 and a loading tube or snout 24 extending from the base portion 17 (FIGS. 1 and 4). A movable or extendable/retractable ram (not shown) is positioned within base portion 17 and loading tube 24 and is movable to move or push bulk materials, such as recyclables, paper waste or newsprint or the like, along the loading tube 24 and out a discharge opening 25 at a discharge end 27 of loading tube 24 and into a container, such as a common transport truck trailer (not shown, but represented by wheels 18 and a trailer floor 20 in FIGS. 1, 2, 7, and 9) or a shipping container or the like. For example, a suitable loading device is disclosed in commonly assigned U.S. Pat. No. 7,275,906, which is hereby incorporated herein by reference in its entirety.

The loading device 16 may be located at a loading dock 22 or the like, and may be fixedly mounted at a platform at a loading dock, whereby a truck trailer may be backed up or otherwise positioned at the loading dock and with the loading tube 24 extending into the trailer. After the container or trailer is generally aligned with loading device 16 and container wall protector device 10, such as at loading dock 22, side plates 12 are extended relative to loading tube 24 and into the trailer, with each side plate 12 being generally adjacent to a respective trailer side wall. Loading device 16 is activated to load bulk materials into the trailer, such as through loading tube 24. As the materials are loaded into the trailer, the extended side plates 12 provide support at the side walls of the container. After the bulk materials are loaded into the trailer and the trailer is sufficiently full, side plates 12 are retracted and/or the trailer is pulled away from the loading dock 22.

In the illustrated embodiment, container wall protector device 10 includes a support assembly 29, which is mounted to the loading tube 24 of loading device 16. Side plates 12 are movably supported and/or guided by support assembly 29. In the illustrated embodiment, support assembly 29 includes a pair of vertical braces 42a, 42b (FIG. 2) at each side of loading tube 24, and a pair of longitudinal members 31 and lateral cross members 33 that cooperate to form a framework partially around the loading tube 24. A channel or support member 30 is attached or mounted to each vertical brace 42a and proximate a lower end of the respective brace 42a, while a bearing mount member or beam 34 is mounted to vertical braces 42a, 42b on each side of loading tube 24 and proximate an upper end of the respective braces 42a, 42b. Although shown as mounted to the loading tube 24 of the loading device 16, it will be appreciated by those skilled in the art that the support assembly 29 may otherwise be mounted at the loading dock 22 and at or near the loading device 16.

Figure 2:
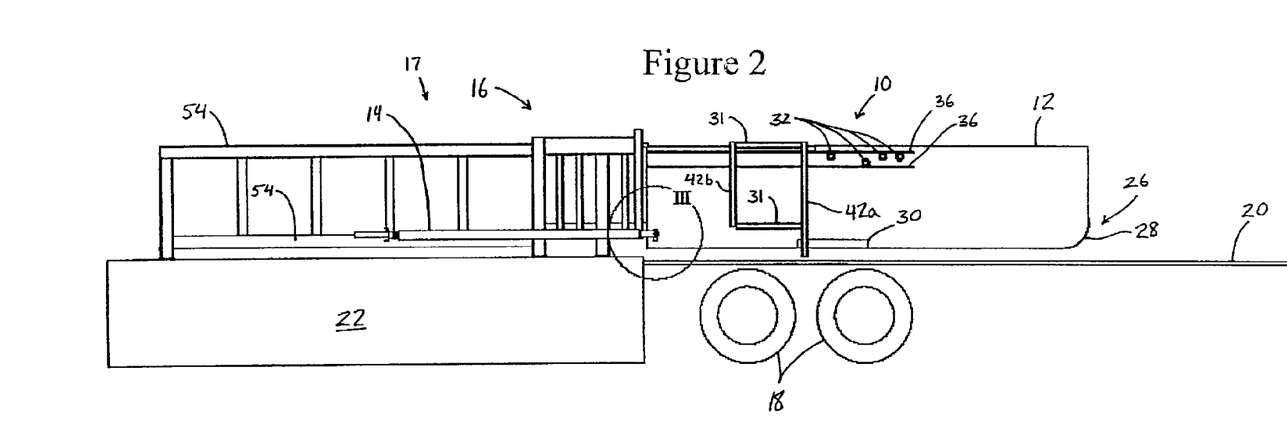
FIG. 2 is a side elevation and partial sectional view of the loader and container wall protector of FIG. 1, having the loading tube removed therefrom.

As best seen in FIGS. 1 and 2, side plates 12 are elongated sections, such as rectangular plates, and may each have a rounded lower corner 26 at the distal end. Lower corner 26 may have a protective skid or ski 28 optionally mounted thereon for protecting trailer floor 20 while extending and retracting side plates 12. Ski 28 preferably has a width greater than the thickness of side plate 12 and may incorporate a flat or curved lower surface for contacting trailer floor 20. Optionally or alternatively, the lower corner 26 and/or ski 28 may incorporate one or more rollers (not shown) for protecting trailer floor 20 and facilitating the extension and retraction of side plates 12. The side plates 12 are movably supported and guided via the support members 30 and bearing members 32 of support assembly 29.

Figure 8:
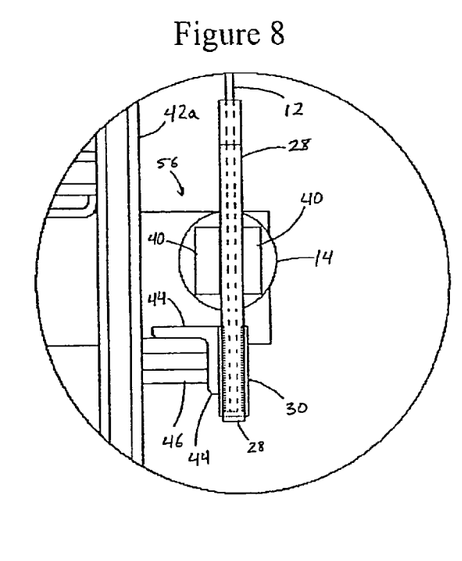
FIG. 8 is an enlarged view of the area designated VIII in FIG. 7.

Each support member 30 is adapted to receive a lower edge portion or surface of the respective side plate 12, as best seen in FIG. 8. Optionally, and desirably, support member 30 is located generally at or near the center of gravity of the respective side plate 12 when the side plate 12 is in the retracted position. In the illustrated embodiment, support member 30 has a U-shaped profile defining a channel that receives a lower edge or portion of side plate 12. Support member 30 is rigidly connected to the lower portion of vertical brace 42a, such as, for example, via a bracket 44 and a lateral mounting member or projection 46. Optionally, support member 30 may be pivotally mounted at the lower portion of vertical brace 42a so as to pivot about a generally horizontal pivot axis that is transverse to a longitudinal axis of support member 30. In such a configuration, support members 30 may pivot with side plates 12 as side plates 12 are extended and retracted, as discussed below.

In addition to supporting at least a portion of the weight of the respective side plate 12, support member 30 may also provide lateral support to side plate 12, such as when pressure is exerted by loading device 16 to the loaded bulk materials that are in contact with side plate 12. Support member 30 may be manufactured from any suitably strong and rigid material, such as steel or the like. Optionally, and desirably, a lubricant may be provided at the lower edge portions of the side plates 12 to reduce wear and enhance sliding movement of side plates 12 relative to support members 30. Although shown in the illustrated embodiments as having a U-shaped profile, it is also envisioned that support member 30 may comprise one or more bearing members or rollers or the like, to facilitate extension and retraction of side plate 12 relative to support member 30. In an embodiment having such bearing members, it is preferable that those bearing members incorporate a groove or channel or lateral portion for at least partially receiving or engaging the lower edge portion of the side plate, or that a separate lateral support member is included, in order to support the side plate laterally while the container or trailer is being loaded. Optionally, the support members and/or the side plates may have a channel or bearings or rollers or the like to provide the sliding or non-sliding movement and support of the side plates relative to the support member.

Side plates 12 are further supported and/or guided at their upper regions by bearing members or rollers 32, which are fixed to bearing mount beams 34 of support assembly 29. In the illustrated embodiment, each side plate 12 includes a bearing track 36 at the upper region of the side plate. Bearing tracks 36 comprise a pair of elongate members or tracks 36a, 36b (FIG. 6) connected to side plate 12 and arranged longitudinally and proximate an upper edge of side plate 12. Bearing members 32 are received in bearing tracks 36 such that bearing members 32 engage and roll along the upper and lower surfaces or tracks 36a, 36b of bearing tracks 36 to movably support side plates 12 at support assembly 29.

Figure 6:
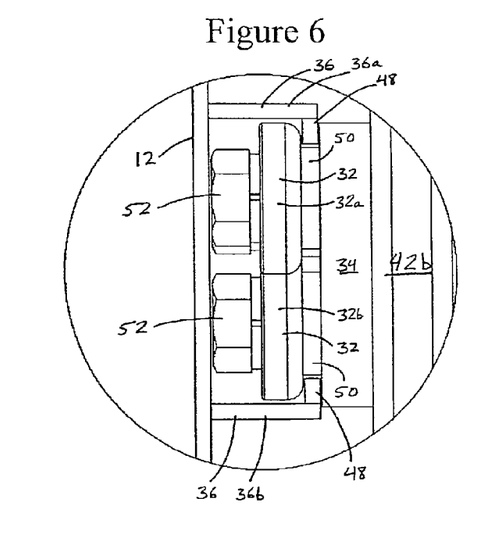
FIG. 6 is an enlarged view of the area designated VI in FIG. 5.
Figure 7:
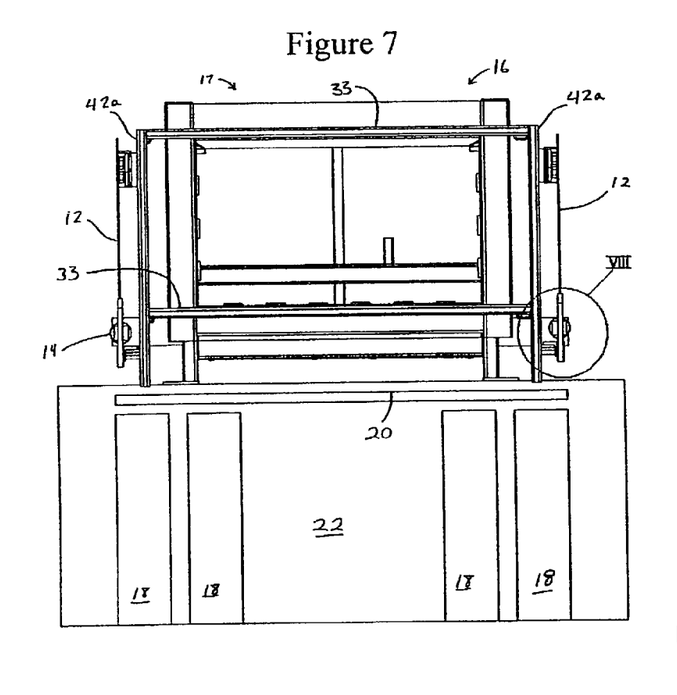
FIG. 7 is a front end elevation of the loader and container wall protector of FIG. 1.

Bearing tracks 36 may comprise a single unit or may comprise an upper bearing track 36a and a lower bearing track 36b. Tracks 36a, 36b are substantially parallel and form a generally C-shaped profile with side plate 12, such as shown in FIG. 6. Bearing tracks 36 project laterally inward from side plates 12 to provide a channel for receiving bearing members 32, and may comprise rolled edges or lips 48 to limit outward lateral movement of side plates 12 relative to the bearing members 32 and to thus provide lateral support to side plates 12 while the container or trailer is being loaded. Bearing tracks 36 may be made from any suitably strong and rigid material, such as steel or the like, and may be connected to side plates 12 such as by welding, or with fasteners or brackets or the like.

Figure 10:
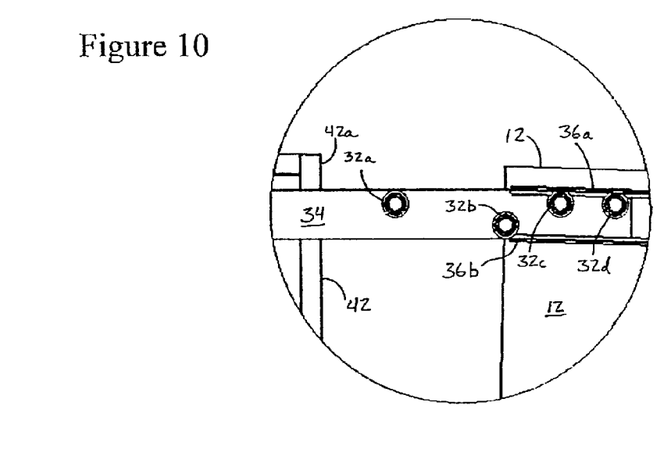
FIG. 10 is an enlarged view of the area designated X in FIG. 9.

Thus, one or more bearing members 32 support at least a portion of the weight of each side plate 12, and may also guide the side plates or support side plates 12 laterally while the container or trailer is being loaded. As best shown in FIG. 6, bearing members 32 are rotatably mounted or connected to bearing mount beam 34, which is connected to vertical braces 42a, 42b and may be connected to the braces of support assembly 29. In the illustrated embodiment, spacers 50 are disposed between bearing members 32 and bearing mount beam 34 to provide a space or channel for receiving lips 48 of bearing tracks 36. Bearing members 32 are connected to bearing mount beam 34 via any suitable means, such as by fasteners, such as, for example, threaded fasteners or bolts 52 that engage threaded bores in bearing mount beam 34. In the illustrated embodiment, and as best seen in FIGS. 2 and 10, four bearing members 32a, 32b, 32c, 32d are arranged to support side plate 12 at various stages of extension and retraction, as discussed below. Although shown as incorporating four bearing members 32, it will be appreciated by those skilled in the art that more or fewer bearing members 32 may be implemented to support side plate 12, such as one or two or three bearing members, or five or more bearing members.

Bearing members 32 may comprise roller bearings, bushings, or any suitable device for supporting side plates 12 with relatively low friction between bearing members 32 and side plates 12. Although bearing members 32 and lips 48 are described herein as cooperating to provide both weight-support and lateral-support functions, it is envisioned that bearing members 32 may optionally provide only weight-support, for example, with separate lateral support members (not shown) providing lateral support.

Figure 3:
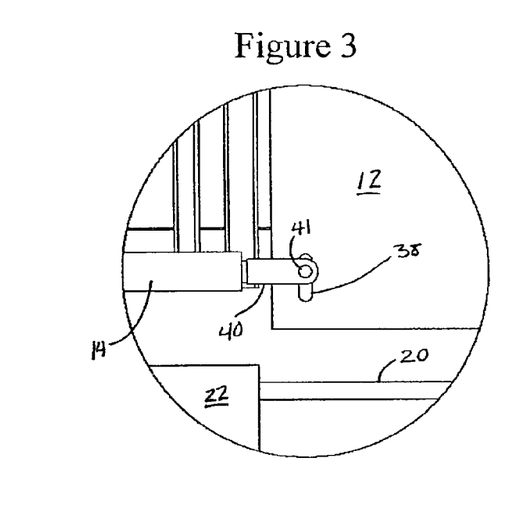
FIG. 3 is an enlarged view of the area designated III in FIG. 2.
Figure 9:
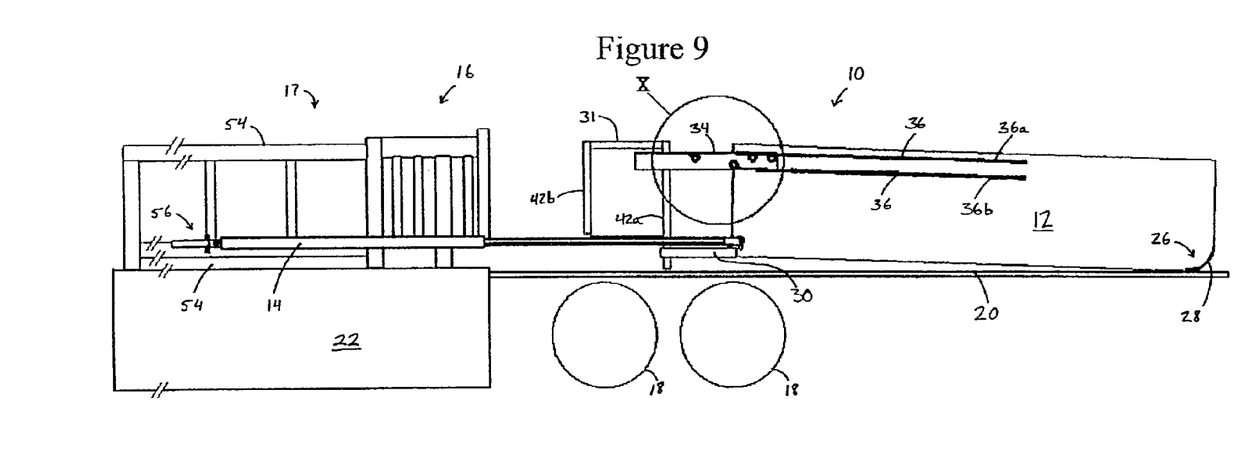
FIG. 9 is a side elevation view of the loader and container wall protector of the present invention with the side plates extended, and having portions of the loader and container wall protector removed to show additional details.

The side plates 12 are extendable and retractable relative to support assembly 29 via extension and retraction or actuation of at least one actuator 14, such as via extension and retraction of an actuator at each side plate. In the illustrated embodiment, each side plate 12 has a substantially vertical slot 38 (FIG. 3) at or near its rearward end that is adapted to receive or attach to an end coupling 40 of actuator 14. End coupling 40 has a pin 41 that is received through slot 38, as shown in FIG. 3. Slot 38 may be configured to allow limited pivotal motion of a respective side plate 12 about an axis transverse to the direction of side plate travel. Thus, side plates 12 may extend from a retracted position to an extended position such that their centers of gravity are moved beyond support members 30. Distal ends of side plates 12 are substantially free to drop, under the force of gravity, urging skis 28 into sliding contact with trailer floor 20, as shown in FIG. 9. As the slide plates pivot in this manner, the rearward ends of the lower edge portions of the side plates 12 remain in the channels of the support members 30 while the outer rollers 32b, 32c, 32d maintain engagement with the respective tracks 36a, 36b of side plates 12, as shown in FIG. 10.

Side plates 12 may be manufactured from any suitably strong and substantially rigid or structurally robust material, such as steel or other suitable metal, or a suitable composite material or the like. Side plates 12 may comprise substantially flat plates or may, for example, be made of corrugated material or comprise other shapes or features for strength or reinforcement. Although shown in the illustrated embodiments as comprising two spaced-apart side plates, it is envisioned that other configurations of side plates may be used. For example, a top plate (not shown) may be used in conjunction with left and right side plates to protect the ceiling of the trailer or shipping container during the loading process. Such a top plate may be connected at an upper edge portion of each of the left and right side plates. Optionally, a top plate and side plates may be joined along their adjacent edges or unitarily formed to provide an inverted U-shaped support channel that is extendable and retractable to provide structural support at the top and side walls of the container, while remaining within the spirit and scope of the present invention.

Side plates 12 extend and retract via rolling engagement of bearing members 32 with bearing tracks 36 at an upper portion of plates 12, and via sliding or rolling engagement of the lower portions of plates 12 with support members 30. When side plates 12 are fully retracted (such as shown in FIG. 2), bearing members 32a, 32c support a portion of the weight of side plates 12 by engaging upper bearing tracks 36a of the respective side plate 12. Forward bearing member 32d (FIG. 10) may be located at a level slightly below that of bearing member 32c, such that when side plate 12 is fully extended and pivoted down (FIG. 10), bearing members 32c, 32d both engage upper bearing track 36a to support a portion of the weight of side plate 12. Bearing members 32c, 32d may be arranged in this manner to more evenly distribute the weight of side plate 12 across bearing members 32c, 32d when distal end of side plate 12 has dropped such that ski 28 at the forward end of side plate 12 is resting upon trailer floor 20, as shown in FIG. 9. Bearing member 32b, which may be constantly or intermittently engaged with lower bearing track 36b during extension and retraction of side plate 12, is located below bearing members 32a, 32c, 32d and may provide mainly a guiding and lateral support function during the side plate extension, retraction, and container loading processes. Lower bearing member 32b may also engage the rearward end portion of lower bearing track 36b to limit upward movement of bearing track 36 (and thus of the rearward end of side plate 12) when the side plate is moved toward and to its fully extended position.

Actuator 14 is extendable and retractable for selectively extending and retracting side plates 12 between the retracted position (FIGS. 1-5, 7, and 8) and the extended position (FIGS. 9 and 10). In the illustrated embodiment, the side wall or container wall protector device or system includes a pair of actuators, with each actuator 14 coupled to a respective side plate 12 by end coupling 40 at vertical slot 38 of the plate 12, as described above with reference to FIG. 3, and also connected to a side of loading device 16, such as at a side frame or framework 54 of loading device 16 and via a brace assembly 56, as shown in FIGS. 1 and 4. Framework 54 may comprise a support structure for both loading device 16 and container wall protector device 10, and may be fixedly mounted or secured to loading dock 22, such as via fasteners 55 or the like. Actuators 14 are selectively extendable (and may cooperate to extend together) to urge or move side plates 12 toward and to the extended position (FIG. 9), such that the distal ends of side plates 12 are adjacent a closed end of the trailer (represented by the end of the trailer floor 20 opposite loading dock 20 in FIGS. 1, 2, 4, and 9), and are selectively and cooperatively retractable to pull side plates 12 to the retracted position (FIG. 2).

Although shown in the illustrated embodiment as comprising two actuators or hydraulic cylinders 14, with one actuator 14 connected to each side plate 12, alternative configurations may be used without departing from the principles of the present invention. For example, a single overhead actuator may be connected to each side plate via a lateral connecting member or the like, or two or more actuators may be coupled to each side plate, or one extension actuator and one retraction actuator may be coupled to each side plate to extend and retract the side plate, respectively, or other suitable extension and retraction means may be implemented to cause extension and retraction of the side plates.

Actuator 14 may comprise any suitable extension and retraction means, such as a known or conventional hydraulic cylinder that is actuatable to both extend and retract (such as via pressurized fluid being provided at either end of the cylinder), and is capable of overcoming the friction and other loads imparted to side plates 12 by bearing elements 32, support members 30, trailer floor 20, and/or the bulk materials within the container or trailer. A controller (not shown) may be provided to enable a user to control the extension and retraction of actuators 14. It will be appreciated by those skilled in the art that actuator 14 represents any linear extension/retraction device or force-applying device capable of sufficient power and stroke to extend and retract the side plates, including but not limited to: a hydraulic cylinder, a pneumatically actuated cylinder, an electrical linear actuator, a threaded carriage and screw-drive assembly, a rack and pinion system, a chain or belt or cable drive system, and/or the like, or may comprise a manually operable device, such as a crank or lever mechanism or the like, operable to extend/retract the side plates in response to a manual input by an operator, without affecting the scope of the present invention.

Accordingly, the trailer or shipping container may be positioned at the loading dock 22 such that the loading tube 24 of the loader 16 extends into the trailer with the side plates 12 generally aligned with the trailer and with spaces adjacent inner surfaces of the trailer or container's side walls. The trailer may be backed up to the loading dock 22 on which container wall protector device 10 and loading device 16 are mounted, such that side plates 12 extend partially into the trailer when side plates 12 are fully retracted. Either before the loading process or at an early stage of the loading process, but before a significant amount of bulk materials is loaded into the trailer by loader 16, the side plate extension process is begun by actuating actuators 14 to push or move side plates 12 toward their extended positions (FIG. 9). As side plates 12 travel from the retracted position (FIG. 2) to the extended position, and while supported and guided by support member 30 and bearing members 32, their centers of gravity may extend past support member 30 and bearing members 32, causing side plates 12 to pivot downward at their distal ends such that lower corners 26 and skis 28 are urged toward trailer floor 20. Skis 28 at corners 26 may contact trailer floor 20 before side plates 12 are fully extended such that skis 28 slide along trailer floor adjacent the trailer side walls until reaching the extended position. Side plates 12 may thus be supported by skis 28, support members 30, and bearing members 32 when at or near their extended positions. Optionally, the lower end corners 26 may not contact the floor of the trailer or container, whereby the side plates may be cantileverly supported by support members 30 and bearing members 32.

After side plates 12 are fully extended (FIG. 9), loading device 16 loads bulk materials into the trailer and may continue to load materials and may exert pressure on the loaded materials to compress or compact the materials within the truck trailer. The loader or loading device may load the materials into the truck trailer in a known manner, and/or may utilize aspects of the loader described in U.S. Pat. No. 7,275,906, which is incorporated by reference above. Bulk materials are thus loaded into the trailer and between side plates 12, such that side plates 12 bear a substantial portion of any outward pressure that may be exerted by the bulk materials as they are loaded into the trailer. The side plates thus are selectively extended into the trailer independent of the operation of the loader actuator or ram so that the side plates may be positioned within the trailer and along the side walls thereof before the loader loads materials into the trailer.

Once the trailer is loaded, actuators 14 may be retracted to pull or move side plates 12 to their retracted positions (FIG. 2) or the truck trailer or container may be moved away from loading dock 22. The side plate retraction process may be substantially similar to, and the reverse of, the extension process described herein, such that a detailed discussion of the retraction process need not be repeated herein.

Therefore, the present invention provides a loading device or machine with a container wall protector that is operable to load bulk materials such as waste or recyclable material, such as paper waste or newsprint or the like, into a container or trailer while protecting the side walls of the container or trailer. The container wall protector includes movable side plates that are extendable and retractable along the container side walls. The side plates are supported vertically and laterally by a support member or channel and one or more bearing elements in a bearing track. The side plates are extended and retracted by hydraulic cylinders or other suitable extension/retraction devices. The loading device may be operable to move bulk materials along a discharge tube and into the trailer via a hydraulic ram or the like. The ram applies pressure to the bulk materials to push them toward the closed end of the trailer, whereby some of the pressure is transferred from the bulk materials toward the side walls of the trailer. The container side walls are substantially shielded or protected from the pressure by the substantially robust or rigid side plates of the container wall protector when the side plates are in their extended position.

Those skilled in the art will recognize that the steps of extending and retracting the side plates 12 may be practiced with a load-hauling trailer, as primarily described above, or with a shipping container or any other container in which bulk materials or goods are loaded for storage or transport.

These and other changes and modifications in the specifically described embodiments may be carried out without departing from the principles of the present invention, which is intended to be limited only by the scope of the appended claims, as interpreted according to the principles of patent law.

The embodiments of the invention in which an exclusive property or privilege is claimed are defined as follows:

1. A container loading system for loading bulk materials into a container, said container loading system comprising:
   a loading device having a loading ram that is movable to load bulk materials into a container having side walls;
   a side wall protector device comprising a pair of spaced-apart movable side plates and at least one actuator connected to said side plates and operable to extend and retract said side plates relative to said loading device, said at least one actuator being selectively operable independently of said loading device;

wherein said side plates are selectively extendable into spaces adjacent the container side walls by said at least one actuator and are retractable therefrom, said side wall protector device substantially limiting outward movement of the loaded bulk materials and limiting said bulk materials from exerting force upon the container side walls when said side plates are extended into said spaces and when said loading device loads bulk materials into the container; and wherein, when said side plates are extended at least partially into the container, said loading ram is movable relative to said side plates and the container to move and load bulk materials into the container and into the space between said side plates, and wherein said side plates are retractable from the container after loading the bulk materials into the container with said loading device.

2. The container loading system of claim 1, wherein said at least one actuator comprises one chosen from a hydraulic cylinder, a pneumatic cylinder, an electrical linear actuator, a threaded carriage and screw-drive assembly, a rack and pinion system, a chain drive system, a belt drive system, and a cable drive system.

3. The container loading system of claim 1, wherein said at least one actuator comprises at least one actuator coupled to each of said side plates.

4. The container loading system of claim 1, wherein said side plates are extendable so as to urge distal ends of said side plates into a space adjacent a front wall of the container.

5. The container loading system of claim 1, further comprising a support assembly at said loading device, wherein said side wall protector device comprises side plates are supported and guided by said support assembly.

6. The container loading system of claim 5, wherein said support assembly comprises a lower side plate support and an upper side plate support.

7. The container loading system of claim 6, wherein said lower side plate support comprises a channel for receiving a lower edge portion of said side plate.

8. The container loading system of claim 6, wherein said upper side plate support comprises at least one roller, said roller engaging at least one track at said side plate.

9. The container loading system of claim 5, wherein said side plates are cantileverly supported and guided by said support assembly whereby said slide plates do not engage a floor surface of the container.

10. The container loading system of claim 1, wherein said side plates comprise skis configured for slidably engaging a floor surface of the container.

11. The container loading system of claim 1, wherein said side plates define a substantially open area between respective distal end portions thereof, and wherein at least some of the bulk materials pass through said open area when loading the bulk materials into the container with said loading device.

12. The container loading system of claim 1, wherein said side plates are configured to slidably engage a floor surface of the container as they are extended and retracted.

13. A method of protecting side walls of a container while bulk materials are loaded into said container, said method comprising:

providing a loading device having a movable loading ram for loading bulk materials into said container;

providing a side wall protector device at said loading device, said side wall protector device comprising a pair of spaced-apart movable side plates and at least one actuator connected to said side plates;

positioning said container at said loading device such that said spaced-apart movable side plates are generally aligned with side walls of said container;

actuating said at least one actuator to extend said side plates into spaces adjacent said side walls;

actuating said loading device to move said loading ram relative to said side plates and said container to load bulk materials into said container and between said side plates when said side plates are at least partially moved into spaces adjacent said side walls; and after loading the bulk materials via said loading device, actuating said at least one actuator to retract said side plates from the spaces adjacent said side walls.

14. The method according to claim 13, wherein said at least one actuator comprises an actuator at each of said side plates.

15. The method according to claim 14, wherein said actuating said at least one actuator comprises simultaneously actuating each of said actuators.

16. The method according to claim 13, wherein said side plates define a substantially open area between respective distal end portions thereof.

17. The method according to claim 13, wherein said actuating said loading device comprises moving said bulk materials along and relative to said container while said side plates remain generally stationary in said container.

18. The method according to claim 13, wherein said container comprises a trailer.

19. The method according to claim 13, wherein said container comprises a shipping container.

20. The method according to claim 13, wherein actuating said loading device comprises moving said loading ram to compact the bulk materials in said container.

\* \* \* \* \*

UNITED STATES PATENT AND TRADEMARK OFFICE
CERTIFICATE OF CORRECTION

PATENT NO. : 7,866,932 B1  Page 1 of 1
APPLICATION NO. : 12/038144
DATED : January 11, 2011
INVENTOR(S) : Dennis C. Pool It is certified that error appears in the above-identified patent and that said Letters Patent is hereby corrected as shown below:

Column 9
Line 31, Claim 5, Delete "wall protector device comprises side" after "said side"

Signed and Sealed this
Thirty-first Day of May, 2011

David J. Kappos
*Director of the United States Patent and Trademark Office*